United States Patent
Klein et al.

(10) Patent No.: US 8,046,187 B2
(45) Date of Patent: Oct. 25, 2011

(54) TEST SYSTEMS FOR MEDIA DRIVES OF DATA STORAGE SYSTEMS

(75) Inventors: Craig A. Klein, Tucson, AZ (US); William W. Owen, Tucson, AZ (US); Winnie Hiu-Tung Tsang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1308 days.

(21) Appl. No.: 11/065,331

(22) Filed: Feb. 24, 2005

(65) Prior Publication Data

US 2006/0190205 A1 Aug. 24, 2006

(51) Int. Cl.
*G01P 21/00* (2006.01)

(52) U.S. Cl. ........................................ 702/108

(58) Field of Classification Search .................. 702/62, 702/108, 110, 115, 117–120, 122, 123, 182–184, 702/186–189; 714/25, 28, 718, 726; 710/5
See application file for complete search history.

(56) References Cited

U.S. PATENT DOCUMENTS

| | | | |
|---|---|---|---|
| 5,134,619 A | | 7/1992 | Henson et al. |
| 5,794,013 A * | | 8/1998 | McBrearty ............... 703/27 |
| 5,872,957 A | | 2/1999 | Worthington et al. |
| 5,881,270 A | | 3/1999 | Worthington et al. |
| 5,951,704 A * | | 9/1999 | Sauer et al. .............. 714/736 |
| 6,263,454 B1 * | | 7/2001 | Gold et al. ................ 714/25 |
| 6,704,895 B1 * | | 3/2004 | Swoboda et al. ........ 714/726 |
| 6,785,744 B2 * | | 8/2004 | Fairclough et al. ........... 710/5 |
| 6,785,849 B1 * | | 8/2004 | Gaspar et al. ............ 714/43 |
| 6,799,156 B1 * | | 9/2004 | Rieschl et al. ............ 703/24 |
| 7,047,460 B1 * | | 5/2006 | Schofield .................... 714/718 |
| 7,054,790 B1 * | | 5/2006 | Rich ............................ 702/186 |
| 7,058,855 B2 * | | 6/2006 | Rohfleisch et al. ........... 714/28 |
| 2002/0062461 A1 * | | 5/2002 | Nee et al. ...................... 714/28 |
| 2004/0199353 A1 * | | 10/2004 | Bingham et al. .............. 702/122 |
| 2004/0210798 A1 * | | 10/2004 | Higashi ......................... 714/27 |
| 2005/0044456 A1 * | | 2/2005 | Fisher et al. .................. 714/718 |

FOREIGN PATENT DOCUMENTS

| | | |
|---|---|---|
| JP | 1009519 A | 1/1989 |
| JP | 4076855 A | 3/1992 |
| JP | 6349255 A | 12/1994 |
| JP | 7044969 A | 2/1995 |
| JP | 7182761 A | 7/1995 |
| JP | 11053421 A | 2/1999 |
| JP | 2001101752 A | 4/2001 |

OTHER PUBLICATIONS

Unisys Corp., Selective Emulation Interpretation Using Transformed Instructions, JP2002502516 Abstract of English language counterpart, published Jan. 22, 2002.

(Continued)

*Primary Examiner* — Mohamed Charioui
(74) *Attorney, Agent, or Firm* — Hamilton & Terrile, LLP; Stephen A. Terrile

(57) ABSTRACT

A test system is described for testing a media drive, such as a tape drive. The test system includes a host emulator, a storage library emulator, and a control system. The host emulator communicates with a first interface of the media drive and mimics a host system to the media drive. The storage library emulator communicates with a second interface of the media drive and mimics a storage library system to the media drive. When in operation, one of the host emulator and the storage library emulator transmits a test message to the media drive responsive to an instruction from the control system. Responsive to the test message, one of the emulators receives a test response from the media drive and transmits the test response to the control system. The control system processes the test message and the test response to evaluate the performance of the media drive.

24 Claims, 5 Drawing Sheets

OTHER PUBLICATIONS

Toshiba Corp., Emulation System, Interface Circuit Emulator, and Information Recording Medium, JP11338728 English Abstract, published Dec. 10, 1999.

IBM, Data Storage Device, JP7084839 English Abtract, published Mar. 31, 1995.

IBM, Automated Data Storage Library with Multipurpose Slots Providing User-Selected Control Path to Shared Robotic Device, JP2004531847 Abstract of English language counterpart, published Oct. 14, 2004.

* cited by examiner

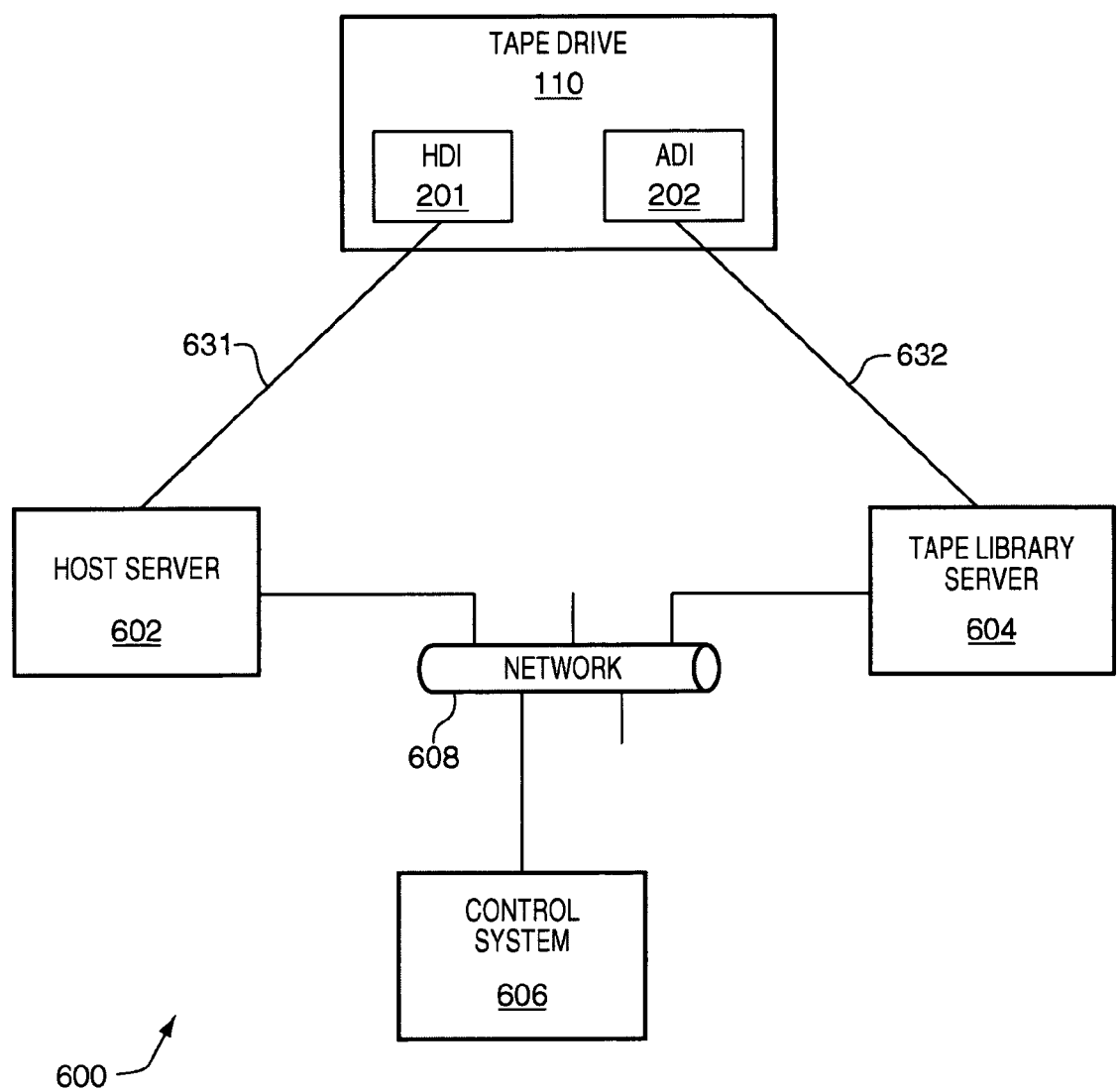

TEST SYSTEMS FOR MEDIA DRIVES OF DATA STORAGE SYSTEMS

BACKGROUND OF THE INVENTION

1. Field of the Invention

The invention relates to the field of data storage systems, and in particular, to test systems for media drives of data storage systems.

2. Statement of the Problem

One type of data storage system used for storing large amounts of data is a tape storage system. A typical tape storage system includes one or more tape drives and a tape library. The tape library includes one or more racks for storing tape cartridges, a robot mechanism for accessing tape cartridges stored on the tape cartridge racks, and a library control unit. The tape library may vary in size from storing a few tape cartridges to storing thousands of tape cartridges. Under control of the library control unit, the robot mechanism is operable to locate a particular tape cartridge on the tape cartridge racks, retrieve the tape cartridge from a tape cartridge rack, transport the tape cartridge to a tape drive, and insert the tape cartridge into the tape drive. The tape drive then reads or writes data to the magnetic tape of the tape cartridge. After use of the tape cartridge is finished, the robot mechanism is operable to remove the tape cartridge from the tape drive, transport the tape cartridge to the appropriate tape cartridge rack, and insert the tape cartridge into the tape cartridge rack.

Host computers access the tape storage system in order to read data from or write data to the tape storage system. The host computers generally communicate with a tape drive of the tape storage system. The tape drive includes a host/drive interface, such as a parallel Small Computer System Interface (SCSI) or a Fiber Channel Protocol SCSI (FCP-SCSI), for communicating with a host computer. The tape drive also includes an automation/drive interface (ADI) for communicating with the library control unit. The ADI communicates according to an automation-to-drive command (ADC) set or protocol that is transported over a transport protocol, such as RS422.

To access a selected file stored in the tape storage system, a host computer contains information from which it can map a particular file to the tape cartridge on which the file is stored. The host computer transmits a command to the tape drive through the host/drive interface. The tape drive then transmits the command to the library control unit through the automation/drive interface. The library control unit identifies the location of the tape cartridge in the tape library, and instructs the robot mechanism to retrieve the appropriate tape cartridge and mount the tape cartridge in the tape drive. The library control unit also transmits responses to the tape drive through the automation/drive interface. The tape drive transmits the responses to the host computer through the host/drive interface. With the tape cartridge loaded in the tape drive, the host computer may read from or write to the desired file.

To determine whether the tape drives will work properly within a tape storage system, the tape drives are tested and their operation is evaluated. For instance, tape drives may be evaluated to determine whether they conform to specifications of a standards body. The tape drives may also be evaluated to determine whether they conform to specifications of a tape library of a particular customer or supplier. A tape drive under test is connected to a tape library. When connected to the tape library, human operators transmit test commands to the tape drive through a host computer. Responsive to the test commands, the tape drive communicates with the library control unit and/or the host computer, and the operation of the tape drive is evaluated. A problem with the current methods of testing tape drives is that the tape drives have to be connected to an actual tape library to be tested. The tape libraries are expensive and inflexible in their operation. It is difficult to cause tape libraries to perform unexpected behaviors that need to be handled by the tape drive and the rest of the system. Because different types of libraries may behave differently to the same stimulus, tape drives are tested with each different type of tape library into which the tape drive may be installed. Thus, the process of testing tape drives can be inefficient and expensive.

SUMMARY OF THE SOLUTION

The present invention solves the above and other related problems with an improved test system for testing of media drives for data storage systems, such as a tape drive for a tape storage system. In one embodiment, the test system includes a host emulator, a storage library emulator, and a control system. The media drive includes a first interface and a second interface. The media drive may comprise a tape drive, a disk drive, a drive for a solid state memory, an optical drive, or a drive for another type of memory. The host emulator communicates with the first interface of the media drive, and emulates a host system to the media drive. The storage library emulator communicates with the second interface of the media drive, and emulates a storage library system to the media drive.

When in operation, the control system generates an instruction. One of the host emulator or the storage library emulator transmits a test message to the media drive responsive to receiving the instruction from the control system. The test message may comprise a command, data, status, or a message. If the host emulator receives the instruction from the control system, then the host emulator transmits the test message to the first interface of the media drive. If the storage library emulator receives the instruction from the control system, then the storage library emulator transmits the test message to the second interface of the media drive. If the message sent is a command, there may be data sent subsequent to the command. If data is sent subsequent to the command, it will follow the same path as the command. If the message is status, the message may include data and status information. Responsive to the test message, one of the host emulator or the storage library emulator receives a test response from the media drive. The emulator receiving the test response transmits the test response to the control system. The control system processes the test message and the test response to evaluate the performance of the media drive. The control system then generates another instruction and the process repeats.

The test system advantageously provides two emulators for testing media drives. The host emulator is able to test the media drive from the host side. The storage library emulator is able to test the media drive from the storage library side. Thus, the media drive does not need to be connected to an actual storage library system to be tested. The storage library emulator mimics a storage library system, and the control system can control the storage library emulator to perform the communications of an actual storage library. Also, the control system can automatically perform tests by executing a test file, reducing the need for human intervention in the testing process.

The invention may include other exemplary embodiments described below.

DESCRIPTION OF THE DRAWINGS

The same reference number represents the same element on all drawings.

FIG. 6 illustrates a test system for testing a tape drive in another embodiment of the invention.

DETAILED DESCRIPTION OF THE INVENTION

Figure 1:
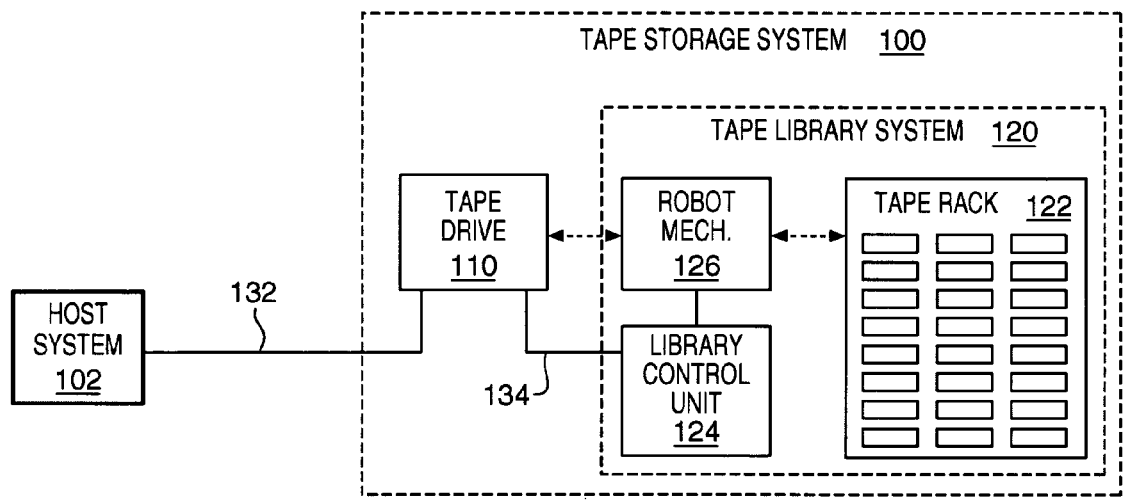
FIG. 1 illustrates a tape storage system connected to a host system.

FIG. 1 illustrates a tape storage system 100 connected to a host system 102. Tape storage system 100 includes a tape drive 110 and a tape library system 120. Although one tape drive 110 is shown, tape storage system 100 may include multiple tape drives. Tape library system 120 includes a tape rack 122, a library control unit 124, and a robot mechanism 126. Tape rack 122 is configured to store a plurality of tape cartridges. Tape drive 110 connects to host system 102 through connection 132. Connection 132 may comprise a parallel SCSI connection, a serial attached SCSI connection, an iSCSI connection, an FCP-SCSI connection, a FICON connection, or another read/write connection from a host or initiator to a storage device. Tape drive 110 connects to library control unit 124 through connection 134. Connection 134 may comprise an RS422 connection, an RS232 connection, a Bluetooth connection, a serial attached SCSI connection, or another type of automation-to-device connection. Tape storage system 100 may include other components, devices, or systems not shown in FIG. 1.

To access a selected tape cartridge stored in tape storage system 100, host system 102 transmits a command to tape drive 110 over connection 132. Tape drive 110 then transmits the command to library control unit 124 over connection 134. Responsive to the command, library control unit 124 identifies the location of the tape cartridge in tape rack 122, and instructs robot mechanism 126 to retrieve the appropriate tape cartridge and mount the tape cartridge in tape drive 110. Under control of library control unit 124, robot mechanism 126 is operable to locate the tape cartridge on tape rack 122, retrieve the tape cartridge from tape rack 122, convey the tape cartridge to tape drive 110, and insert the tape cartridge into tape drive 110. Tape drive 110 then reads or writes data to the tape. If a read operation is performed, tape drive 110 reads data from the tape and transmits the data to host system 102 over connection 132. If a write operation is performed, tape drive 110 receives data from host system 102 over connection 132 and writes the data to the tape. After use of the tape is finished, robot mechanism 126 is operable to remove the tape cartridge from tape drive 110, convey the tape cartridge to tape rack 122, and insert the tape cartridge into tape rack 122. Library control unit 124 may perform more functions than those described as is known in the art.

Figure 2:
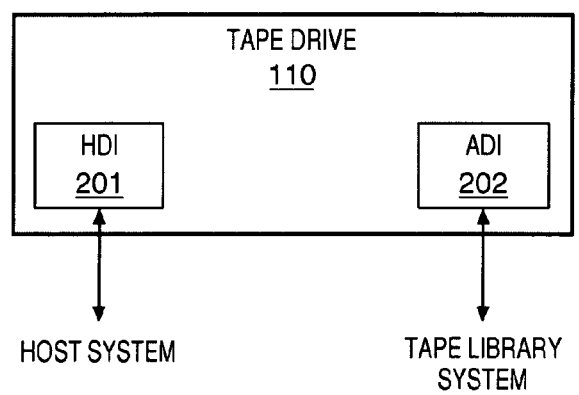
FIG. 2 illustrates a tape drive.

FIG. 2 illustrates further details of tape drive 110. Tape drive 110 includes a host/drive interface (HDI) 201 and an automation/drive interface (ADI) 202. Tape drive 110 includes other components well known to those of ordinary skill in the art. HDI 201 is configured to communicate with host system 102 over connection 132 (see FIG. 1). HDI 201 may comprise a parallel SCSI interface, a serial attached SCSI interface, an iSCSI interface, an FCP-SCSI, a FICON interface, or another type of interface. ADI 202 is configured to communicate with library control unit 124 over connection 134 (see FIG. 1). ADI 202 may comprise an RS422 interface, a Bluetooth connection, a serial attached SCSI connection, or another type of interface. ADI 202 communicates according to an automation-to-drive command (ADC) set or protocol. The transport protocol, such as RS422, Bluetooth, etc, may change but ADI 202 uses the automation-to-drive command (ADC) set or protocol for communication on top of the transport layer.

Improved test systems are needed to test tape drive 110 and other media drives interfacing a host system with a storage library.

FIGS. 3-6 and the following description depict specific exemplary embodiments of the present invention to teach those skilled in the art how to make and use the best mode of the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 3:
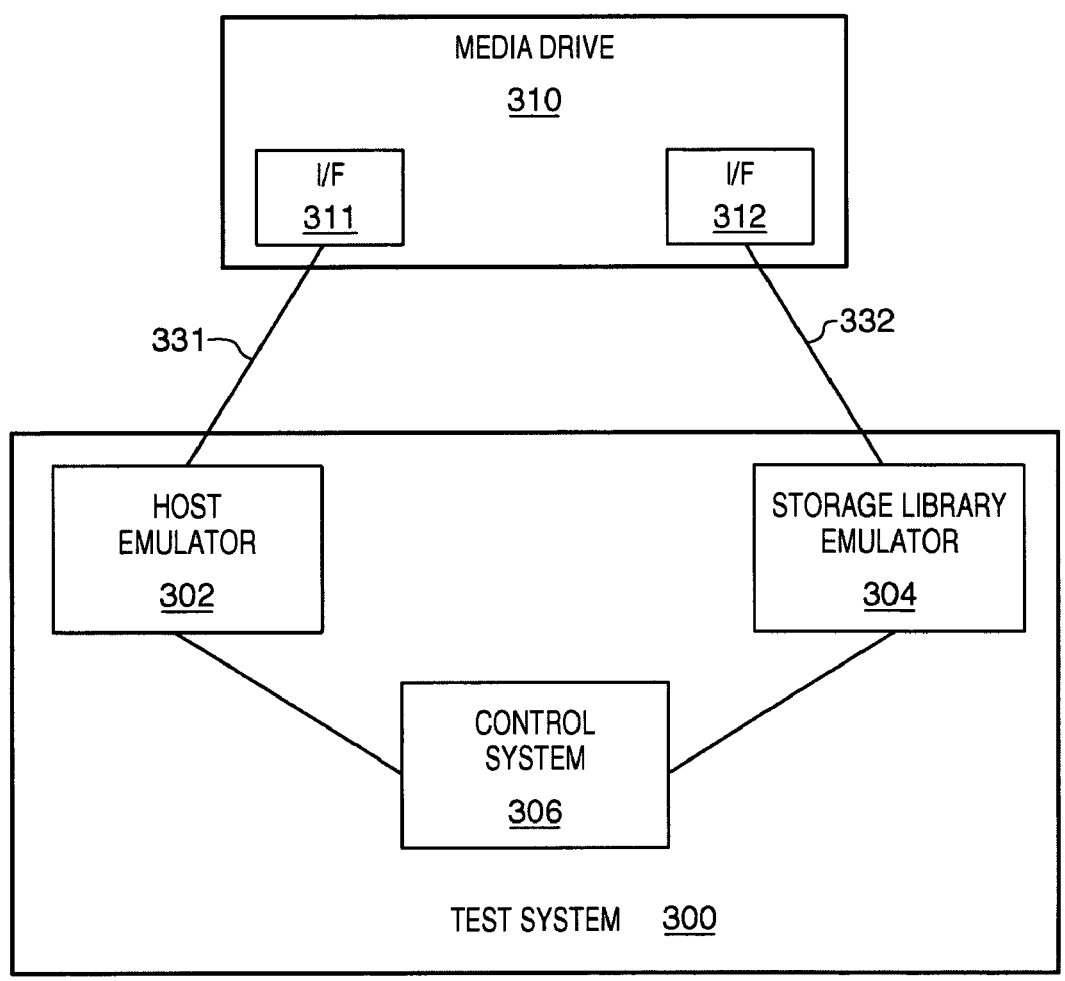
FIG. 3 illustrates a test system for a media drive in an exemplary embodiment of the invention.

FIG. 3 illustrates a test system 300 for a media drive 310 in an exemplary embodiment of the invention. Test system 300 includes a host emulator 302, a storage library emulator 304, and a control system 306. Media drive 310 includes a first interface (I/F) 311 and a second interface 312. Media drive 310 may comprise a tape drive, a disk drive, an optical drive, a drive for a solid state memory, or a drive for another type of memory. Host emulator 302 connects to interface 311 over connection 331 and communicates according to a first protocol. The first protocol is a protocol used by media drive 310 to communicate with a host system, such as FCP-SCSI protocol. Storage library emulator 304 connects to interface 312 over connection 332 and communicates according to a second protocol. The second protocol is a protocol used by media drive 310 to communicate with a storage library system or library control unit, such as automation-to-drive command (ADC) protocol. Host emulator 302 and storage library emulator 304 communicate with control system 306. Test system 300 and media drive 310 may include other components, devices, or systems not shown in FIG. 3.

Media drive 310 comprises any device of a data storage system having at least two interfaces, where one of the interfaces is adapted to communicate with a host system and another interface is adapted to communicate with a device in the data storage system. The two interfaces do not have to physically separate. One example of media drive 310 is a tape drive of a tape storage system. Host emulator 302 comprises any system that emulates a host system communicating with media drive 310 for messages, commands, data, status, or other communications. To "emulate" means to act like, perform like, or otherwise imitate one or more functions of a device or system. Storage library emulator 304 comprises any system that emulates a storage library system communicating with media drive 310 for messages, commands, data, status, or other communications. One example of a storage library system is a tape library system of a tape storage system. Storage library emulator 304 does not comprise an actual storage library system, but is a system that emulates the communications of a storage library system to media drive 310. Control system 306 comprises any system that controls test procedures or processes of test system 300. Host emulator 302 and its functions, and storage library emulator 304 and its functions, may be combined into a single emulator or multiple emulators.

Test system 300 may be implemented in hardware, software, or a combination of both. For instance, test system 300 may be comprised of instructions that are stored on storage media. The instructions may be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing systems are computers, integrated circuits, and logic circuitry. Those skilled in the art are familiar with instructions, processing systems, and storage media.

Figure 4:
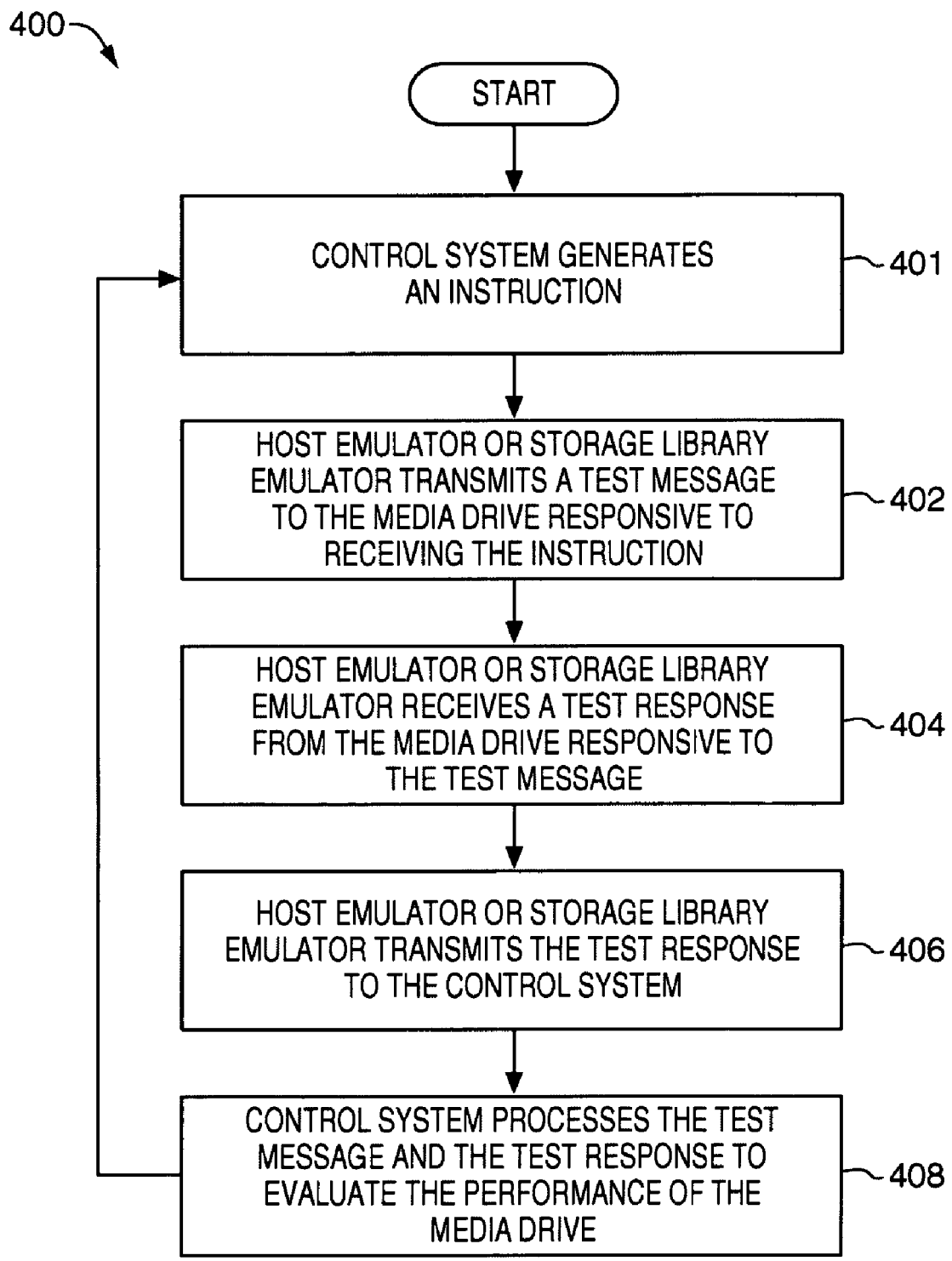
FIG. 4 is a flow chart illustrating a method of operating a test system in an exemplary embodiment of the invention.

FIG. 4 is a flow chart illustrating a method 400 of operating test system 300 in an exemplary embodiment of the invention. In step 401, control system 306 generates an instruction. Control system 306 may generate the instruction based on a previous test response or based on a test file executed by control system 306. In step 402, one of host emulator 302 or storage library emulator 304 transmits a test message to media drive 310 responsive to receiving the instruction from control system 306. In step 404, one of host emulator 302 or storage library emulator 304 receives a test response from media drive 310 responsive to the test message. In step 406, host emulator 302 or storage library emulator 304 transmits the test response to control system 306. In step 408, control system 306 processes the test message and the test response to evaluate the performance of media drive 310. Method 400 then repeats in step 401 and control system 306 generates another instruction. Control system 306 may generate the next instruction based on the received test response. Control system 306 may also generate the next instruction based on a test file.

The following provides some examples of method 400.

In a first example, host emulator 302 transmits a test message in the first protocol over connection 331 to interface 311 of media drive 310 responsive to an instruction from control system 306. Storage library emulator 304 receives a test response from media drive 310 responsive to the test message. Storage library emulator 304 receives the test response in the second protocol from interface 312 of media drive 310. Storage library emulator 304 transmits the test response to control system 306. Control system 306 processes the test message and the test response to evaluate the performance of media drive 310. Control system 306 then generates another instruction responsive to the test response. Assume that control system 306 determines that storage library emulator 304 is to transmit another test message responsive to the test response. Storage library emulator 304 transmits the test message to interface 312 of media drive 310 responsive to the instruction. Host emulator 302 receives a test response from media drive 310 responsive to the test message. Host emulator 302 transmits the test response to control system 306. Control system 306 processes the test message and the test response to evaluate the performance of media drive 310. This process may repeat for any number of test messages as determined by control system 306.

In a second example, storage library emulator 304 transmits a test message in the second protocol over connection 332 to interface 312 of media drive 310 responsive to an instruction from control system 306. Host emulator 302 receives a test response from media drive 310 responsive to the test message. Host emulator 302 receives the test response in the first protocol from interface 311 of media drive 310. Host emulator 302 transmits the test response to control system 306. Control system 306 processes the test message and the test response to evaluate the performance of media drive 310. Control system 306 then generates another instruction responsive to the test response. Assume that control system 306 determines that host emulator 302 is to transmit another test message responsive to the test response. Host emulator 302 transmits the test message to interface 311 of media drive 310 responsive to the instruction. Storage library emulator 304 receives a test response from media drive 310 responsive to the test message. Storage library emulator 304 transmits the test response to control system 306. Control system 306 processes the test message and the test response to evaluate the performance of media drive 310. This process may repeat for any number of test messages as determined by control system 306.

In a third example, storage library emulator 304 transmits a test message in the second protocol over connection 332 to interface 312 of media drive 310 responsive to an instruction from control system 306. Storage library emulator 304 receives a test response from media drive 310 responsive to the test message. Storage library emulator 304 receives the test response in the second protocol from interface 312 of media drive 310. Storage library emulator 304 transmits the test response to control system 306. Control system 306 processes the test message and the test response to evaluate the performance of media drive 310.

Figure 5:
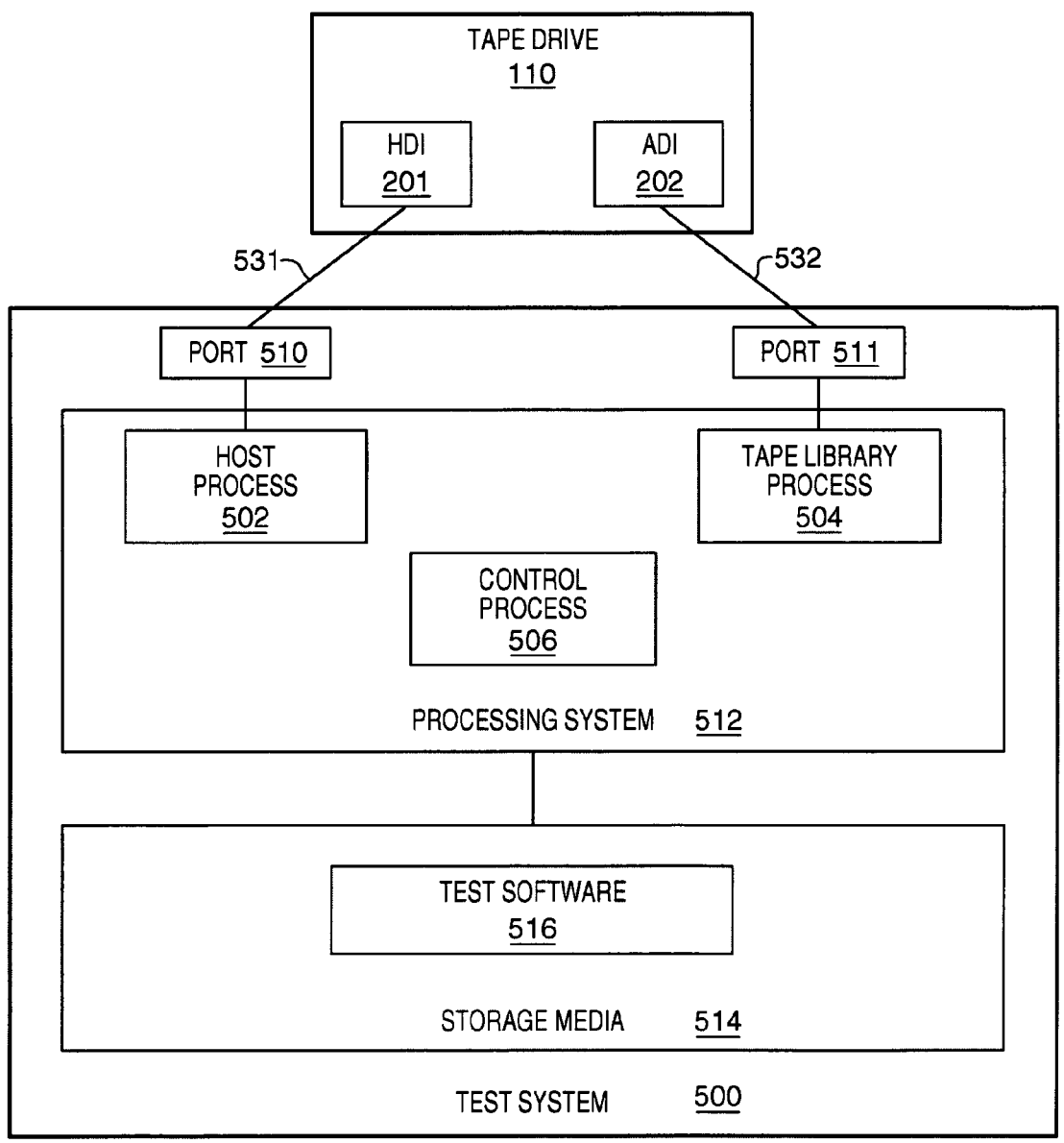
FIG. 5 illustrates a test system for testing a tape drive in an embodiment of the invention.

FIGS. 5-6 illustrate two different embodiments of a test system for testing tape drive 110 shown in FIGS. 1-2. FIG. 5 illustrates a test system 500 in an exemplary embodiment of the invention. In this embodiment, test system 500 includes a first port 510, a second port 511, a processing system 512, and storage media 514. Port 510 connects to HDI 201 of tape drive 110 over connection 531. Port 511 connects to ADI 202 of tape drive 110 over connection 532. Processing system 512 connects to ports 510-511 and connects to storage media 514. Storage media 514 stores test software 516.

Test software 516 may be retrieved and executed by processing system 512. When processing system 512 executes test software 516, processing system 512 executes host process 502, tape library process 504, and control process 506. Host process 502 communicates with HDI 201 of tape drive 110 according to a first protocol. Tape library process 504 communicates with ADI 202 of tape drive 110 according to a second protocol. Host process 502, tape library process 504, and control process 506 are illustrated in processing system 512 as these processes are being executed in processing system 512.

FIG. 6 illustrates a test system 600 in another exemplary embodiment of the invention. In this embodiment, test system 600 includes a host server 602, a tape library server 604, a control system 606, and a network 608. Host server 602 communicates with HDI 201 of tape drive 110 (see FIG. 2) using a first protocol over connection 631. Tape library server 604 communicates with ADI 202 of tape drive 110 using a second protocol over connection 632. Host server 602 and tape library server 604 connect to network 608. Control system 606 also connects to network 608. Network 608 may comprise an Ethernet or some other network type.

An example operation of test system 600 is described below. The example operation would also apply to test system 500 and its processes. In test system 600, control system 606 generates an instruction and transmits the instruction to host server 602. Control system 606 may automatically generate the instruction based on a test file written to cause test system 600 to perform a series of tests. Assume for this embodiment that the first protocol used between host server 602 and HDI 201 comprises FCP-SCSI protocol. Responsive to the instruction from control system 606, host server 602 transmits a test message in FCP-SCSI protocol to tape drive 110. The test message may be a valid command to verify that tape drive 110 is handling the command set properly, or may be an invalid command to verify that tape drive 110 is generating the proper error messages. Host server 602 is to emulate an actual host system. The test message is of the type typically transmitted by a host system to a tape drive.

Tape drive 110 receives the test message in FCP-SCSI protocol, for example, through HDI 201. If the test message is of the type to be handled in tape drive 110, then tape drive 110 processes the test message, generates a test response to the test message, and transmits the test response in FCP-SCSI protocol to host server 602 through HDI 201. Host server 602 receives the test response and transmits the test response to control system 606. Control system 606 processes the test message and the test response to evaluate the performance of tape drive 110.

If the test message from host server 602 is of the type to be forwarded to a tape library system, then tape drive 110 transmits the test response to tape library server 604. Assume for this embodiment that the second protocol comprises ADC protocol. Tape library server 604 transmits the test response in ADC protocol through ADI 202. Tape library server 604 is to emulate an actual tape library system or a library control unit of a tape library system. Tape library server 604 receives the test response in ADC protocol, and transmits the test response to control system 606. Control system 606 processes the test message and the test response to evaluate the performance of tape drive 110.

Depending on the test response received by tape library server 604, control system 606 may generate another instruction to have tape library server 604 respond to the test response. Responsive to the instruction from control system 606, tape library server 604 transmits a test message in ADC protocol to tape drive 110. The test response is of the type typically transmitted by a tape library system to a tape drive. Tape drive 110 receives the test response in ADC protocol through ADI 202.

If the test message is of the type to be forwarded to a host system, then tape drive 110 transmits a test response to host server 602 in FCP-SCSI protocol through HDI 201. Host server 602 transmits the test response received from tape drive 110 to control system 606. Control system 606 processes the test message and the test response to evaluate the performance of tape drive 110.

Test messages may also be initiated by tape library server 604. Responsive to an instruction from control system 606, tape library server 604 transmits a test message in ADC protocol to tape drive 110. The test message is of the type typically transmitted by a tape library system to a tape drive.

Tape drive 110 receives the test message in ADC protocol through ADI 202. Test messages from tape library system 604 typically are not forwarded to a host system. Therefore, tape drive 110 processes the test message and generates a test response. Tape drive 110 transmits the test response in ADC protocol to tape library system 604 through ADI 202. When tape library server 604 receives the test response, tape library server 604 transmits the test response received from tape drive 110 to control system 606. Control system 606 processes the test response and evaluates the performance of tape drive 110.

If the test message initiated by tape library server 604 is of the type to be forwarded to a host system, then tape drive 110 transmits the test response to host server 602 in FCP-SCSI protocol through HDI 201. Host server 602 receives the test response in FCP-SCSI protocol, and transmits the test response to control system 606. Control system 606 processes the test message and the test response to evaluate the performance of tape drive 110.

Depending on the test response received by host server 602, control system 606 may generate another instruction to have host server 602 respond to the test response. Responsive to the instruction from control system 606, host server 602 transmits a test message in FCP-SCSI protocol to tape drive 110. The test message is of the type typically transmitted by a host system to a tape drive. Tape drive 110 receives the test message in FCP-SCSI protocol through HDI 201. If the test message is of the type to be forwarded to a tape library system, then tape drive 110 transmits a test response to tape library server 604 in ADC protocol through ADI 202. Tape library server 604 transmits the test response received from tape drive 110 to control system 606. Control system 606 processes the test message and the test response to evaluate the performance of tape drive 110.

The following is an example of a set of test commands. Control system 606 generates an instruction for a move medium command. Responsive to the instruction from control system 606, host server 602 transmits the move medium command in FCP-SCSI protocol to tape drive 110. Tape drive 110 receives the move medium command in FCP-SCSI protocol through HDI 201. The move medium command is the type to be forwarded to a tape library system, so tape drive 110 transmits the move medium command to tape library server 604 in ADC protocol through ADI 202. Tape library server 604 receives the move medium command in ADC protocol, and transmits the move medium command to control system 606. Control system 606 verifies that tape drive 110 operated correctly responsive to the move medium command.

Control system 606 then generates an instruction for a status responsive to the move medium command. Responsive to the instruction from control system 606, tape library server 604 transmits the status in ADC protocol to tape drive 110. Tape drive 110 receives the status in ADC protocol through ADI 202. The status is the type to be forwarded to a host system, so tape drive 110 transmits the status to host server 602 in FCP-SCSI protocol through HDI 201. Host server 602 transmits the status received from tape drive 110 to control system 606. Control system 606 verifies that tape drive 110 operated correctly responsive to the status.

Control system 606 then generates an instruction for a load command responsive to the status. Responsive to the instruction from control system 606, host server 602 transmits the load command in FCP-SCSI protocol to tape drive 110. Tape drive 110 receives the load command in FCP-SCSI protocol through HDI 201. The load command is the type of command to be handled in tape drive 110, so tape drive 110 processes the load command. Responsive to the load command, tape drive 110 loads the tape cartridge in tape drive 110. Tape drive 110 transmits status in FCP-SCSI protocol to host server 602 through HDI 201. Host server 602 receives the status and transmits the status to control system 606. Control system 606 verifies that tape drive 110 operated correctly responsive to the load command.

Control system 606 then generates an instruction for a read command responsive to the status. Responsive to the instruction from control system 606, host server 602 transmits the read command in FCP-SCSI protocol to tape drive 110. Tape drive 110 receives the read command in FCP-SCSI protocol through HDI 201. The read command is the type of command to be handled in tape drive 110, so tape drive 110 processes the read command. Responsive to the read command, tape drive 110 reads data from a tape cartridge in tape drive 110. Tape drive 110 transmits the data and status in FCP-SCSI protocol to host server 602 through HDI 201. Host server 602 receives the data and status, and transmits the data and status to control system 606. Control system 606 verifies that tape drive 110 operated correctly responsive to the read command.

Control system 606 then generates an instruction for an unload command responsive to the status. Responsive to the instruction from control system 606, host server 602 transmits the unload command in FCP-SCSI protocol to tape drive 110. Tape drive 110 receives the unload command in FCP-SCSI protocol through HDI 201. The unload command is the type of command to be handled in tape drive 110, so tape drive 110 processes the unload command. Responsive to the unload command, tape drive 110 unloads the tape cartridge in tape drive 110. Tape drive 110 transmits status in FCP-SCSI protocol to host server 602 through HDI 201. Host server 602 receives the status and transmits the status to control system 606. Control system 606 verifies that tape drive 110 operated correctly responsive to the unload command.

Control system 606 then generates an instruction for a move medium command responsive to the read command. Responsive to the instruction from control system 606, host server 602 transmits the move medium command in FCP-SCSI protocol to tape drive 110. Tape drive 110 receives the move medium command in FCP-SCSI protocol through HDI 201. The move medium command is the type to be forwarded to a tape library system, so tape drive 110 transmits the move medium command to tape library server 604 in ADC protocol through ADI 202. Tape library server 604 receives the move medium command in ADC protocol, and transmits the move medium command to control system 606. Control system 606 verifies that tape drive 110 operated correctly responsive to the move medium command.

Control system 606 then generates an instruction for a status responsive to the move medium command. Responsive to the instruction from control system 606, tape library server 604 transmits a status in ADC protocol to tape drive 110. Tape drive 110 receives the status in ADC protocol through ADI 202. The status is the type to be forwarded to a host system, so tape drive 110 transmits the status to host server 602 in FCP-SCSI protocol through HDI 201. Host server 602 transmits the status received from tape drive 110 to control system 606. Control system 606 verifies that tape drive 110 operated correctly responsive to the status.

Test systems 500 and 600 advantageously provide a mechanism for testing tape drives without having to couple the tape drives to a physical tape library system. In test system 500, the host process and the tape library process are interdependent and interlocked to emulate a host system and a tape library system to the tape drive. In test system 600, the host server and the tape library server are interdependent and interlocked to emulate a host system and a tape library system to the tape drive. If a customer provides specifications for a tape drive in order to work with that customer's tape library system, then a test file can be generated to test the tape drive for those specifications. Test system 500 or 600 can then automatically test the tape drive for compliance with the customer's specifications. Also, if a standards body adopts specifications for tape storage systems, then a test file can be generated to test the tape drive for those specifications. Test system 500 or 600 can then automatically test the tape drive for compliance with the standard specifications. This process is more efficient than prior test processes.

We claim:

1. A test system for testing a media drive for a data storage system, the test system comprising:
    a control system adapted to generate an instruction;
    a host emulator adapted to transmit a test message to a first interface of the media drive responsive to receiving the instruction from the control system, to receive a test response from the first interface of the media drive, and to transmit the test response to the control system; and
    a storage library emulator adapted to transmit a test message to a second interface of the media drive responsive to receiving the instruction from the control system, to receive a test response from the second interface of the media drive, and to transmit the test response to the control system;
    the control system further adapted to process the test message and the test response to evaluate the performance of the media drive.

2. The test system of claim 1 wherein:
    the host emulator is adapted to transmit the test message to the first interface in a first protocol; and the storage library emulator is adapted to transmit the test message to the second interface in a second protocol.

3. The test system of claim 2 wherein the first protocol comprises FCP-SCSI protocol.

4. The test system of claim 3 wherein the second protocol comprises ADC protocol.

5. The test system of claim 1 wherein the media drive comprises a tape drive for a tape storage system.

6. The test system of claim 5 wherein:
    the first interface comprises a host/drive interface for the tape drive; and
    the second interface comprises an automation/drive interface for the tape drive.

7. The test system of claim 1 wherein: the control system is adapted to generate the instruction based on a previous test response.

8. The test system of claim 1 wherein: the control system is adapted to generate the instruction based on a test file being executed by the control system.

9. A method of operating a test system for testing a media drive for a data storage system, the media drive comprises a first interface and a second interface, the method comprising:
    generating an instruction in a control system;
    transmitting a test message from one of a host emulator to the first interface of the media drive or a storage library emulator to the second interface of the media drive, responsive to receiving the instruction from the control system;
    receiving a test response from the second interface of the media drive in the storage library emulator;
    transmitting the test response from the storage library emulator to the control system; and
    processing the test message and the test response in the control system to evaluate the performance of the media drive.

10. The method of claim 9 wherein:
    transmitting the test message from the host emulator to the first interface comprises transmitting the test message to the first interface in a first protocol; and
    transmitting the test message from the storage library emulator to the second interface comprises transmitting the test message to the second interface in a second protocol.

11. The method of claim 10 wherein the first protocol comprises FCP-SCSI protocol.

12. The method of claim 11 wherein the second protocol comprises ADC protocol.

13. The method of claim 9 wherein the media drive comprises a tape drive for a tape storage system.

14. The method of claim 13 wherein:
    the first interface comprises a host/drive interface for the tape drive; and
    the second interface comprises an automation/drive interface for the tape drive.

15. The method of claim 9 wherein:
generating the instruction in the control system comprises generating the instruction in the control system based on a previous test response.

16. The method of claim 9 wherein:
generating the instruction in the control system comprises generating the instruction in the control system based on a test file executed by the control system.

17. A test system for testing a tape drive, the test system comprising:
a control system adapted to generate a first instruction;
a host emulator adapted to transmit a first test message in a first protocol to a host/drive interface (HDI) of the tape drive responsive to receiving the first instruction from the control system; and
a tape library emulator adapted to receive a first test response in a second protocol from an automation/drive interface (ADI) of the tape drive, and to transmit the first test response to the control system;
the control system further adapted to process the first test message and the first test response to evaluate the performance of the tape drive.

18. The test system of claim 17 wherein:
the control system is adapted to generate a second instruction; the tape library emulator is adapted to transmit a second test message in the second protocol to the ADI of the tape drive responsive to receiving the second instruction from the control system;
the host emulator is adapted to receive a second test response in the first protocol from the HDI of the tape drive responsive to the second test message, and to transmit the second test response to the control system; and
the control system is adapted to process the second test message and the second test response to evaluate the performance of the tape drive.

19. The test system of claim 18 wherein:
the control system is adapted to generate a third instruction;
the tape library emulator is adapted to transmit a third test message in the second protocol to the ADI of the tape drive responsive to receiving the third instruction from the control system, to receive a third test response in the second protocol from the ADI of the tape drive responsive to the third test message, and to transmit the third test response to the control system; and
the control system is adapted to process the third test message and the third test response to evaluate the performance of the tape drive.

20. The test system of claim 19 wherein the control system automatically generates the first, second, and third instructions according to a test file.

21. The test system of claim 17 wherein the first protocol comprise FCP-SCSI protocol.

22. The test system of claim 17 wherein the second protocol comprises ADC protocol.

23. The test system of claim 17 wherein:
the host emulator comprises a host server;
the tape library emulator comprises a tape library server; and
the host server and the tape library server connect to the control system via a network.

24. The test system of claim 17 wherein:
the host emulator comprises a host process executed by a processing system;
the tape library emulator comprises a tape library process executed by the processing system; and
the control system comprises a control process executed by the processing system.

\* \* \* \* \*